US012686209B2

(12) United States Patent
Thelander et al.

(10) Patent No.: US 12,686,209 B2
(45) Date of Patent: Jul. 21, 2026

(54) FULL COLOR INKJET PRINTHEAD FOR REDUNDANT PRINTING

(71) Applicant: MEMJET TECHNOLOGY LIMITED, Leopardstown (IE)

(72) Inventors: Jason Thelander, North Ryde (AU); David Burke, North Ryde (AU); Andrew Thomas, North Ryde (AU)

(73) Assignee: Memjet Technology Limited, Dublin (IE)

( * ) Notice: Subject to any disclaimer, the term of this patent is extended or adjusted under 35 U.S.C. 154(b) by 239 days.

(21) Appl. No.: 18/405,344

(22) Filed: Jan. 5, 2024

(65) Prior Publication Data

US 2024/0140096 A1 May 2, 2024

Related U.S. Application Data

(63) Continuation of application No. 17/935,674, filed on Sep. 27, 2022, now Pat. No. 12,090,760, which is a (Continued)

(51) Int. Cl.

*B41J 2/155* (2006.01)
*B41J 2/14* (2006.01)

(Continued)

(52) U.S. Cl.

CPC ................ *B41J 2/155* (2013.01); *B41J 2/14* (2013.01); *B41J 2/14145* (2013.01);

(Continued)

(58) Field of Classification Search

CPC . B41J 2/155; B41J 2/14; B41J 2/14145; B41J 2/1433; B41J 2/175; B41J 2/1752;

(Continued)

(56) References Cited

U.S. PATENT DOCUMENTS

| | | | |
|---|---|---|---|
| 6,464,333 | B1 | 10/2002 | Scheffelin et al. |
| 2002/0140777 | A1 | 10/2002 | Silverbrook et al. |

(Continued)

FOREIGN PATENT DOCUMENTS

| | | |
|---|---|---|
| EP | 12044533 | 4/2005 |
| EP | 1738912 | 1/2007 |

(Continued)

OTHER PUBLICATIONS

International Search Report mailed on Apr. 10, 2018, for PCT Application No. PCT/EP2018/051367, filed on Jan. 19, 2018, 6 pages.

(Continued)

*Primary Examiner* — Bradley W Thies

(74) *Attorney, Agent, or Firm* — Garson & Gutierrez, PC

(57) ABSTRACT

An inkjet printhead for printing redundantly in four colors. The printhead includes: an ink manifold having first, second, third and fourth ink reservoirs for supplying first, second, third and fourth inks, respectively; and first and second parallel printhead chips mounted on the ink manifold. The ink manifold has ink feed slots configured for supplying the first and second inks to the first printhead chip and for supplying the third and fourth inks to the second printhead chip.

9 Claims, 9 Drawing Sheets

Related U.S. Application Data continuation of application No. 17/377,186, filed on Jul. 15, 2021, now Pat. No. 11,485,139, which is a continuation of application No. 16/905,584, filed on Jun. 18, 2020, now Pat. No. 11,090,939, which is a continuation of application No. 16/377,069, filed on Apr. 5, 2019, now Pat. No. 10,717,282, which is a continuation of application No. 15/888,832, filed on Feb. 5, 2018, now Pat. No. 10,293,609.

(60) Provisional application No. 62/455,346, filed on Feb. 6, 2017.

(51) Int. Cl.

| | |
|---|---|
| ***B41J 2/175*** | (2006.01) |
| ***B41J 2/19*** | (2006.01) |
| ***B41J 2/21*** | (2006.01) |
| ***B41J 25/34*** | (2006.01) |

(52) U.S. Cl.

CPC ............ *B41J 2/1433* (2013.01); *B41J 2/175* (2013.01); *B41J 2/1752* (2013.01); *B41J 2/17523* (2013.01); *B41J 2/19* (2013.01); *B41J 2/21* (2013.01); *B41J 2/2103* (2013.01); *B41J 25/34* (2013.01); *B41J 2002/14362* (2013.01); *B41J 2002/14419* (2013.01); *B41J 2002/14491* (2013.01); *B41J 2202/19* (2013.01); *B41J 2202/20* (2013.01); *B41J 2202/21* (2013.01)

(58) Field of Classification Search

CPC ... B41J 2/17523; B41J 2/19; B41J 2/21; B41J 2/2103; B41J 25/34; B41J 2002/14362; B41J 2002/14419; B41J 2002/14491; B41J 2202/19; B41J 2202/20; B41J 2202/21

See application file for complete search history.

(56) References Cited

U.S. PATENT DOCUMENTS

| | | | | |
|---|---|---|---|---|
| 2006/0290755 | A1* | 12/2006 | Lee ............................ | B41J 2/16 347/86 |
| 2008/0299361 | A1 | 12/2008 | Anderson et al. | |
| 2013/0120497 | A1 | 5/2013 | Silverbrook et al. | |
| 2013/0194349 | A1* | 8/2013 | Ciminelli ............. | B41J 2/14201 347/50 |
| 2017/0274653 | A1 | 9/2017 | Shimazoe et al. | |

FOREIGN PATENT DOCUMENTS

| | | |
|---|---|---|
| EP | 1946927 | 7/2008 |
| JP | 1178018 | 3/1999 |
| JP | H1178018 A * | 3/1999 |
| WO | 2015116076 | 8/2015 |
| WO | 2016032497 | 3/2016 |
| WO | 2016043303 | 3/2016 |

OTHER PUBLICATIONS

International Search Report mailed on Apr. 20, 2018, for PCT Application No. PCT/EP2018/051365, filed on Jan. 19, 2018, 6 pages.

Written Opinion of the International Searching Authority mailed on Apr. 10, 2018, for PCT Application No. PCT/EP2018/051367, filed on Jan. 19, 2018, 8 pages.

Written Opinion of the International Searching Authority mailed on Apr. 20, 2018, for PCT Application No. PCT/EP2018/051365, filed on Jan. 19, 2018, 9 pages.

* cited by examiner

FULL COLOR INKJET PRINTHEAD FOR REDUNDANT PRINTING

CROSS REFERENCE TO RELATED APPLICATIONS

This application is a Continuation of U.S. application Ser. No. 17/935,674 filed Sep. 27, 2022, which is a Continuation of U.S. application Ser. No. 17/377,186 filed Jul. 15, 2021, which is a Continuation of U.S. application Ser. No. 16/905,584 filed Jun. 18, 2020, which is a Continuation of U.S. application Ser. No. 16/377,069 filed Apr. 5, 2019, which is Continuation of U.S. application Ser. No. 15/888,832 filed Feb. 5, 2018, which claims priority of U.S. Provisional Application No. 62/455,346 filed Feb. 6, 2017, the contents of each of which are incorporated herein by reference in their entirety.

FIELD OF THE INVENTION

This invention relates to an inkjet printhead. It has been developed primarily to provide a robust full-color printhead suitable for high-speed pagewide printing.

BACKGROUND OF THE INVENTION

The Applicant has developed a range of Memjet® inkjet printers as described in, for example, WO2011/143700, WO2011/143699 and WO2009/089567, the contents of which are herein incorporated by reference. Memjet® printers employ one or more stationary inkjet printheads in combination with a feed mechanism which feeds print media past the printhead in a single pass. Memjet® printers therefore provide much higher printing speeds than conventional scanning inkjet printers.

Currently, multi-color Memjet® printheads for desktop printing are based on a liquid crystal polymer (LCP) manifold described in U.S. Pat. No. 7,347,534, which delivers four colors of ink through five color channels (CMYKK) of the printhead to a plurality of butted printhead chips. The Memjet® printhead chips are bonded to a surface of the LCP manifold via an apertured die-attach film comprised of a central polymer web sandwiched between opposite adhesive layers. The LCP manifold cooperates with the die-attach film to direct ink from each of five ink channels to respective color planes of each printhead chip via a series of tortuous ink pathways. Redundancy in the black (K) channel is useful for improving print quality and black optical density.

However, at high print speeds, the LCP manifold has some practical limitations. The multiple labyrinthine ink pathways for delivering multiple inks from the LCP manifold to the printhead chips may be responsible for unexpected de-priming when the printhead is running at high speeds. Without a sufficiently large body of ink close to the printhead chips, the chips may become starved of ink under periods of high ink demand and lead to chip de-priming. Secondly, the labyrinthine ink pathways are susceptible to trapping air bubbles; if an air bubble becomes trapped in the system, the printhead chips will become starved of ink and de-prime. It would therefore be desirable to provide a color printhead suitable for high-speed printing, which is tolerant of air bubbles and less susceptible to de-prime events.

Whilst LCP is a satisfactory choice of material for A4 printheads, having a CTE similar to silicon, it typically lacks the required rigidity to manufacture longer printheads (e.g. A3 printheads). It would be desirable to provide a printhead architecture suitable for manufacturing printheads that may be longer than A4-sized.

Printhead electrical connections in pagewide printheads are typically via one or more flex PCBs, which wrap around an exterior sidewall of the printhead. An alternative, more complex approach is to route electrical wiring through layers of a laminated ceramic ink manifold (see, for example, U.S. Pat. No. 6,322,206 assigned to HP, Inc.). However, flex PCBs are expensive and add significantly to manufacturing costs. Moreover, bending of a flex PCB through a tight angle places strain on the PCB and limits the components that may be incorporated thereon. It would therefore be desirable to provide a robust, inexpensive alternative to conventional electrical wiring arrangements used in pagewide printheads.

For inkjet digital presses, multiple monochrome printheads are typically stacked along a media feed direction, as described in U.S. Pat. No. 8,845,080. This arrangement enables very high speed printing by making use of multiple ink channels in each printhead to print one color of ink. However, a problem with stacking printheads in this manner is that precise registration of the printheads is required when printheads are replaced by the user. Further, there are high demands on media feed mechanisms, which must maintain alignment of the print media with the printheads through a relatively long print zone. It would therefore be desirable to provide a replaceable printhead suitable for desktop printing, which can print multiple colors at high speeds and does not require registration of multiple printheads in the field.

SUMMARY OF THE INVENTION

In a first aspect, there is provided an inkjet printhead comprising:

- a rigid elongate manifold having first, second, third and fourth parallel ink supply channels extending along the manifold and corresponding first, second, third and fourth parallel rows of outlets defined in the manifold, each row of outlets being in fluid communication with a respective one of the ink supply channels, wherein a first ink delivery group contains the first and second rows of outlets and a second ink delivery group contains the third and fourth rows of outlets;
- a first array of printhead chips mounted to a unitary lower surface of the manifold, each first printhead chip receiving ink from the first and second rows of outlets; and
- a second array of printhead chips mounted to the lower surface of the manifold, the second array of printhead chips being parallel and aligned with the array of printhead chips, each second printhead chip receiving ink from the third and fourth rows of outlets,
- wherein a distance between the first and second ink delivery groups is greater than a distance between the first and second rows of outlets or the third and fourth rows of outlets.

The printhead according to the first aspect advantageously enables printing of four colors of ink (e.g. CMYK) from a single replaceable printhead, whilst simplifying printhead plumbing and alignment issues. In particular, a multi-channeled printhead chip may be plumbed for printing two ink colors only and the printhead chips are attached to a common surface of the manifold in, for example, two parallel rows to allow printing of all four ink colors. By arranging two rows of printheads chips on a single replaceable manifold, the precise alignment of the chips can be performed with high accuracy at the factory rather than in the field by a user or technician. Moreover, since each printhead chip is configured for printing 4 or more (e.g. 4, 5, 6 or 7) ink channels, then each color has redundancy which increases print speed and/or minimizes print artifacts caused by dead nozzles. In the case of a Memjet® printhead chip having 5 ink channels, the center channel may be inoperative to provide 2 ink channels for each color. This arrangement advantageously increases the distance between color channels printing different colors, thereby minimizing color mixing on the nozzle plate of the printhead chip. In other words, the printhead according to the first aspect provides an excellent compromise between the demands of print speed, redundancy, printhead alignment and color mixing on the nozzle plate.

Preferably, each row of printhead chips is attached to the lower surface via a respective intervening structure. The intervening structure is preferably common to a respective row of printhead chips.

Preferably, each intervening structure comprises a film or a shim having a plurality of apertures defined therein.

Preferably, the shim has a CTE of 5 ppm/° C. or less, more preferably a CTE of 2 ppm/° C. or less.

Preferably, the shim is comprised of an alloy of iron and at least one other metal selected from the group consisting of: nickel, cobalt and chromium. Typically, the alloy is an Invar material. Preferably, the Invar material is a single-phase alloy consisting of around 36% nickel and 64% iron; however, other Invar variants are within the scope of the present invention.

Preferably, the shim is received in a respective recessed portion of the lower surface. The recessed portion may be defined by one or more step features of the lower surface.

Preferably, each row of printhead chips comprises a plurality of butting printhead chips arranged in a line.

Preferably, each ink supply channel contains a different colored ink, and each printhead chip is configured for printing two different colors of ink.

Preferably, each printhead chip comprises at least two rows of aligned nozzles for each color of ink. Accordingly, the printhead has redundancy for each color of ink, which advantageously improves print quality in a pagewide array.

Preferably, each printhead chip is asymmetrical about a longitudinal axis.

Preferably, the first and second rows of printhead chips have mirror symmetry, the second row of printhead chips being oppositely oriented relative to the first row of printhead chips.

Preferably, opposite distal longitudinal edges of printhead chips in the first and second rows have bond pads for electrical connection to the printhead chips.

Preferably, a distance between the first and second rows of printhead chips is less than 50 mm, less than 30 mm, less than 20 mm or less than 15 mm. Preferably, the distance between the first and second rows of printhead chips is in the range of 5 to 20 mm.

Preferably, a width of a print zone defined by the first and second rows of printhead chips is less than 50 mm, less than 30 mm, less than 20 mm or less than 15 mm. Preferably, the print zone has a width in the range of 5 to 20 mm.

In a second aspect, there is provided an inkjet printhead comprising:

- a manifold having a plurality of ink outlets defined in a manifold surface;
- a plurality of printhead chips mounted to the manifold surface and aligned with the ink outlets;
- a PCB mounted to the manifold surface and offset from the ink outlets, the PCB being electrically connected to the printhead chips; and
- a shield plate covering the PCB, wherein the shield plate has one face in thermal contact with the PCB and an exposed opposite face defining a lower surface of the printhead.

The printhead according to the second aspect advantageously warms a protective shield plate for a printhead so as to minimize condensation of ink aerosol on the shield plate during printing. Condensation of ink aerosol is problematic in inkjet printers, especially during longer print runs, because formation of condensed ink droplets on the printhead potentially result in a reduction in print quality.

Preferably, the shield plate is electrically insulating.

Preferably, the printhead chips are mounted to the manifold surface via a shim.

Preferably, the shield plate intimately contacts a lower surface of the PCB.

Preferably, the PCB is a rigid PCB (e.g. a PCB based on FR4)

Preferably, the lower surface of the PCB is coplanar with a lower surface of the shim.

Preferably, the PCB is thicker than the shim and the manifold surface is stepped to accommodate the PCB and the shim having respective coplanar lower surfaces.

Preferably, the shield plate is bonded to the PCB and part of the shim.

Preferably, the shim has at least one void region offset from the printhead chips, the void region thermally isolating part of the shield plate from the manifold.

Preferably, the printhead comprises a row of printhead chips and the PCB extends longitudinally adjacent the row of printhead chips.

Preferably, the printhead comprises first and second rows of printhead chips, the first row of printhead chips having a respective first PCB and the second row of printhead chips having a respective second PCB, wherein the first and second PCBs are positioned at opposite distal longitudinal sides of the first and second rows of printhead chips.

Preferably, the first and second PCBs wrap at least partially around ends of the first and second rows of printhead chips.

Preferably, a central longitudinal region is defined between the first and second rows of printhead chips.

Preferably, the shield plate is a perimeter shield plate covering the first and second PCBs, the perimeter shield plate having a central leg covering the central longitudinal region.

Preferably, the first and second rows of printhead chips are mounted to the manifold via a shim, wherein the shim has at least one void region coincident with the central longitudinal region, the void region thermally isolating the central leg of the shield plate from the manifold.

In a third aspect, there is provided an inkjet printhead comprising:

- a rigid elongate manifold having one or more ink supply channels extending along its length and a plurality of ink outlets defined therein;
- a shim attached to the manifold, the shim having a plurality of shim apertures for receiving ink from the ink outlets; and
- a plurality of printhead chips adhesively bonded to the shim, each printhead chip receiving ink from one or more of the ink outlets;

wherein the shim is comprised of a metal alloy having a coefficient of thermal expansion (CTE) of 5 ppm/° C. or less.

The invention according to the third aspect advantageously enables the construction of relatively long monolithic printheads, which may be longer than A4-sized (e.g. greater than 210 mm in length). For example, the invention according to the second aspect enables the construction of monolithic A3-sized printheads.

As foreshadowed above, LCP is a common choice of material for pagewide printheads due to its moldability, stiffness and relatively low CTE. However, whilst stiffer than other plastics, LCP does not have the requisite rigidity for the construction of long monolithic printhead manifolds. Although metals are an obvious choice of material for constructing rigid printhead manifolds, the thermal expansion properties of metals are not generally considered to be suitable for attachment of printhead chips directly onto the metal due to the mismatch in thermal expansion characteristics between the metal and silicon. One approach to the problem of constructing longer printheads is to thermally isolate each printhead chip on its own respective carrier. However, individual printhead chip carriers are unsuitable for a rows of butting printhead chips and increase a width of the print zone.

The printhead according to the third aspect employs a suitable metal alloy (e.g. Invar) shim for adhesive bonding of a plurality of printhead chips to the manifold using, for example, an epoxy adhesive applied as a liquid to one or both bonding surfaces. The shim has minimal expansion at high temperatures and provides a stable structure for mounting a plurality of printhead chips to the manifold. This, in turn, provides greater flexibility in the choice of materials for the manifold. The manifold may be comprised of a material which is the same or different than the shim, and may be selected on the basis of stiffness, cost, manufacturability etc. For example, the manifold may be comprised of a material, such as stainless steel, Invar or a polymer. Typically, the manifold is comprised of a same material as the shim.

Preferably, the shim is comprised of an alloy of iron and at least one other metal selected from the group consisting of: nickel, cobalt and chromium.

Preferably, the manifold is a one-piece structure.

Preferably, the manifold has a longitudinal ink cavity defined in a lower surface thereof, and wherein the shim is attached to a lower surface of the manifold so as to bridge across the longitudinal ink cavity.

Preferably, the longitudinal ink cavity has a roof and sidewalls extending between the roof and the lower surface, the plurality of ink outlets being defined in the roof.

Preferably, a longitudinal rib divides the ink cavity into longitudinal ink feed channels at either side of the rib, the rib having a lower surface coplanar with the lower surface of the manifold.

Preferably, the shim is bonded to the lower surfaces of the rib and the manifold.

Preferably, each printhead chip has a central portion aligned with the rib and opposite side portions overlapping with respective longitudinal ink feed channels.

Preferably, the shim and a PCB are adjacently bonded to a lower surface of the manifold.

Preferably, the shim and the PCB have coplanar lower surfaces.

Preferably, the lower surface of the manifold is stepped to accommodate different thicknesses of the shim and the PCB.

In a fourth aspect, there is provided an inkjet printhead comprising:

a rigid elongate manifold having at least one ink supply channel and a lower surface with a longitudinal ink cavity defined therein, the longitudinal ink cavity having a roof and sidewalls extending between the roof and the lower surface;

a shim attached to the lower surface so as to bridge across the longitudinal ink cavity, the shim having a plurality of shim apertures for receiving ink from the longitudinal ink cavity; and a plurality of printhead chips attached to the shim, each printhead chip receiving ink from the longitudinal ink cavity via one or more of the shim apertures, wherein a plurality of through-holes are defined in the manifold to provide fluid communication between the ink supply channel and the longitudinal ink cavity, each through-hole having a first portion with a first end defined in the roof and a second portion extending through a respective sidewall with a second end defined in the lower surface of the manifold, the shim sealing the second end.

The printhead according to the fourth aspect advantageously provides an open back channel architecture for the printhead chips, which facilitates escape of any bubbles emanating from the chips and/or escape of bubbles otherwise trapped in the printhead. In particular, the second portions of the through-holes maximize the opportunity for venting of bubbles into relatively large ink supply channels where the bubbles can be easily flushed from the printhead. Furthermore, the longitudinal ink cavity having a bridging shim avoids labyrinthine ink pathways in the printhead, thereby maximizing the availability of ink to the printhead chips and minimizing the risk of inkjet nozzles becoming starved of ink at high print frequencies.

Preferably, at least part of the second portion of each through-hole is offset from a respective printhead chip.

Preferably, each second portion is configured to enable an air bubble to rise from a respective printhead chip towards the ink supply channel.

Preferably, each second portion defines a notch in a respective sidewall.

Preferably, each through-hole is circular and the first and second portions are generally semi-circular.

In a fifth aspect, there is provided an inkjet printhead comprising:

a rigid elongate manifold having at least one ink supply channel and a lower surface having a plurality of printhead chips mounted thereon;

a rigid PCB attached to the lower surface of the manifold, the PCB extending a length of the manifold and projecting laterally beyond a sidewall of the manifold;

a lead retainer attached to the sidewall of the manifold; and a plurality of leads extending upwardly from contact pads positioned along a first longitudinal edge portion of the PCB, each lead being secured to the sidewall of the manifold via the lead retainer, wherein the PCB supplies power and data to the printhead chips via electrical connections between the PCB and the printhead chips.

The printhead according to the fifth aspect advantageously provides a robust wiring arrangement for supplying power and data to printhead chips via a conventional PCB based on, for example, an FR-4 substrate.

Preferably, the printhead comprises a pair of PCBs flanking a pair of rows of printhead chips, each PCB supplying power and data to a respective row of printhead chips.

Preferably, each PCB is covered by a shield plate surrounding the printhead chips, the shield plate defining a capping surface for the printhead.

Preferably, the printhead is symmetrical about a central longitudinal plane.

Preferably, the lower surface of the manifold has a step and an opposite second longitudinal edge portion of the PCB is butted against the step.

Preferably, the leads are flared outwardly from the lead retainer towards the contact pads of the PCB.

In a sixth aspect, there is provided an inkjet printhead comprising:

- a rigid elongate manifold having one or more ink supply channels extending along its length, each ink supply channel having a base defining a plurality of ink outlets and a roof comprising an elongate flexible film; and
- a plurality of printhead chips mounted to the manifold, each printhead chip receiving ink from one or more of the ink outlets, wherein the flexible film comprises a plurality of operatively independent bellows positioned along a length of the flexible film.

The printhead according to the sixth aspect advantageously provides dynamic responses to pressure changes in elongate ink supply channels. In particular, the plurality of discrete bellows enables a rapid, dynamic response to localized pressure changes in any given region of an ink supply channel, whilst avoiding undesirable resonance effects in other regions of the ink supply channel. Moreover, the printhead according to the sixth aspect enables dampening of pressure spikes in degassed inks, in contrast with printheads having air boxes for dampening pressure spikes.

Preferably, each bellows comprises a corrugated region of the flexible film.

Preferably, the bellows are operatively separated from each other by baffles.

Preferably, the baffles extend upwards from a continuous corrugated film so as to divide the film into contiguous and operatively independent bellows.

Preferably, the printhead comprises a cover plate engaged with the manifold and positioned for covering the flexible film, the cover plate having a plurality of vent holes open to atmosphere.

Preferably, wherein the flexible film is comprised of a polymer.

Preferably, each ink supply channel has a manifold port at one longitudinal end and the bellows hang into the ink supply channel from sidewalls thereof.

Preferably, a level of the manifold port corresponds to a level of a lowest part of the bellows hanging into the ink supply channel.

In a seventh aspect, there is provided a multi-channel fluid coupling for a printhead, the fluid coupling comprising:

- a body having a first channel and a second channel, the second channel being relatively longer than the first channel;
- a first inlet port and a first outlet port at opposite ends of the first channel; and
- a second inlet port and a second outlet port at opposite ends of the second channel, wherein:

- the first and second channels are configured for proportionally modulating a flow resistance of fluids flowing therethrough.

The fluid coupling of the seventh aspect advantageously compensates for pressure drops due to different length fluid channels in the fluid coupling. Thus, relatively longer and relatively shorter fluid channels in the coupling will have the same or similar pressure drops. Typically, longer channels experience greater pressure drops than similarly dimensioned shorter channels due to increased viscous drag. This is undesirable in systems, such as printhead ink delivery systems, where ink pressures are critical for optimizing printhead performance and, ultimately, print quality. The fluid coupling of the seventh aspect allows compact fluid couplings to be designed with relatively longer and relatively shorter channels, whilst at the same time minimizing pressure drop differences for fluids exiting the fluid coupling. In this way, pressure regulators upstream of the fluid coupling can set relative fluid pressures for an inkjet printhead without being undermined by idiosyncratic fluid dynamics of the fluid coupling.

Preferably, the flow resistance of the fluids flowing through the first and second channels are equalized.

Preferably, the second channel comprises at least a portion having a larger cross-sectional area than the first channel.

Preferably, the second channel has a sloped wall.

Preferably, the first and second outlet ports extend transversely relative to the first and second inlets ports.

Preferably, the second channel has a roof sloped from the outlet channel towards the inlet channel.

Preferably, a plurality of first channels and a plurality of second channels.

Preferably, the first inlet ports being relatively proximal the first outlet ports and the second inlet ports being relatively distal the second outlet ports.

Preferably, the fluid coupling comprises two first channels and two second channels for four ink colors.

Preferably, the inlet ports or the outlet ports are arranged radially.

In a further aspect, there is provided an inkjet printhead comprising:

- a manifold having at least first and second ink supply channels; and
- a fluid coupling as described above connected to at least one end of the manifold.

The fluid coupling may be the fluid coupling may be an inlet coupling for the printhead. Preferably, the inlet ports of the inlet coupling extend perpendicularly relative to a longitudinal axis of the printhead.

Preferably, the inlet ports extend in an opposite direction to an ink ejection direction of the printhead.

Preferably, the first and second ink supply channels extend longitudinally along the manifold.

In an eighth aspect, there is provided an inkjet printhead comprising:

- a manifold having a plurality of ink outlets defined in a manifold surface;
- a shim adhesively bonded to the manifold surface, the shim having apertures aligned with the ink outlets;
- a first row of printhead chips adhesively bonded to the shim; and
- a second row of printhead chips adhesively bonded to the shim, wherein the shim is a one-part common shim for mounting all printhead chips of the first and second row.

The printhead according to the eighth aspect advantageously facilitates relative alignment of multiple rows of printhead chips.

Preferably, the shim comprises first and second longitudinal shim portions corresponding to the first and second rows of printhead chips, each of the first and second longitudinal shim portions comprising respective first and second apertures.

Preferably, the first and second longitudinal shim portions are interconnected via a plurality of trusses. Typically, the trusses extend transversely relative to the longitudinal shim portions.

Preferably, the shim is comprised of a metal or metal alloy. Typically, the shim and the manifold are comprised of a same material.

Preferably, the shim comprises a plurality of mechanical alignment tabs engaged with complementary alignment features defined in the manifold surface.

Preferably, the shim comprises first and second longitudinal shim portions interconnected via a plurality of trusses and wherein the trusses comprise one or more of the alignment tabs.

Preferably, the first and second rows comprise a plurality of printheads chips butted together in a line.

In a ninth aspect, there is provided a printhead cartridge comprising:

an elongate manifold;

a plurality of printhead chips mounted to a lower part of the manifold; and a casing mounted to an upper part of the manifold, wherein the casing comprises a first casing part and a second casing part, the first and second parts being longitudinally biased towards each such that the casing is expandable along a longitudinal axis of the manifold.

The printhead cartridge according to the ninth aspect advantageously minimizes strain in the manifold caused by longitudinal expansion during use. Typically, printhead cartridges have a casing for user handling, which is attached to the manifold. In relatively short printheads, any longitudinal expansion of the manifold is relatively small; however, in longer printheads (e.g. A3-sized printheads) thermal expansion of the manifold becomes more significant and a rigid casing unduly constraining longitudinal expansion will result in bowing of the printhead and a loss of print quality. The two-part casing according to the ninth aspect minimizes bowing, especially in longer printheads.

Preferably, the casing is configured for user handling of the printhead cartridge.

Preferably, the printhead cartridge comprises a central locator positioned between the first and second casing parts.

Preferably, the first and second casing parts are biased towards the central locator.

Preferably, the first and second casing parts are interconnected via a spring clip bridging across the central locator.

Preferably, the central locator has an alignment feature for aligning the printhead cartridge during user insertion in a printer.

Preferably, the manifold is comprised of a metal or metal alloy and may be a one-piece structure.

Preferably, the manifold is comprised of a metal alloy having a CTE of 5 ppm/° C. or less.

Preferably, the casing has openings at one or both ends thereof for receiving ink connectors. The ink connectors may be connected to a fluid coupling of the type described above.

In a tenth aspect, there is provided an inkjet printhead comprising:

a manifold having a plurality of ink outlets defined in a manifold surface;

a plurality of printhead chips mounted to the manifold surface, each printhead chip having an odd number of color channels, each color channel having at least one respective row of inkjet nozzle devices, wherein a central color channel of each printhead chip is a dummy color channel that does not receive ink from the manifold.

The printhead according to the tenth aspect advantageously employs a dummy color channel to improve structural integrity of the printhead as well as, in some embodiments, provide improved thermal regulation during use. Moreover, printheads having, for example, five color channels may be adapted for printing two colors with redundancy in each color whilst enjoying the aforementioned advantages of improved robustness and, optionally, thermal regulation.

Preferably, the dummy color channel is absent an ink supply channel defined in a backside surface of the printhead.

Preferably, a longitudinal rib of the manifold surface is aligned with the dummy color channel.

Preferably, the printhead chips are mounted to the manifold surface via a shim.

Preferably, the shim has a shim rib aligned with the longitudinal rib of the manifold surface and a pair of longitudinal shim slots at either side of the shim rib for receiving ink from respective ink outlets of the manifold.

Preferably, only color channels at either side of the dummy color channel receive ink from the manifold.

Preferably, each printhead chip receives two different colors of ink from the manifold.

Preferably, a pair of longitudinal ink feed channels are defined at either side of the longitudinal rib, each longitudinal ink feed channel delivering ink to at least one respective color channel, or more preferably, a plurality of respective color channels.

In one embodiment, each printhead chip comprises five color channels including a central dummy channel, wherein a first pair of color channels at one side of the dummy color channel print a first ink and a second pair of color channels at an opposite side of the dummy color channel print a second ink.

Preferably, each color channel comprises a pair of rows of inkjet nozzle devices.

In some embodiments, inkjet nozzles devices of the dummy color channel are electrically to a PCB.

Preferably, the inkjet nozzle devices are thermally-actuated devices, such that, in use, the dummy color channel facilitates temperature regulation of a respective printhead chip via actuation of the inkjet devices in the dummy color channel.

In a further aspect, there is provided a printhead chip having an odd number of color channels, each color channel comprising at least one row of inkjet nozzle devices, wherein a central color channel of the printhead chip is a dummy color channel that does not receive any ink.

Inkjet nozzle devices of the dummy color channel may be electrically connected to drive electronics in the printhead chip for thermal regulation.

It will be appreciated that preferred embodiments as described above in connection with certain aspects of the invention may be equally applicable to each of the first, second, third, fourth, fifth, sixth, seventh, eighth, ninth and tenth aspects. Preferred embodiments described above are not intended to be strictly associated with one particular aspect and the skilled person will readily appreciate where preferred embodiments are applicable to certain other aspects of the invention.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids and the like. Where reference is made to fluids or printing fluids, this is not intended to limit the meaning of "ink" herein.

As used herein, the term "mounted" includes both direct mounting and indirect mounting via an intervening part.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
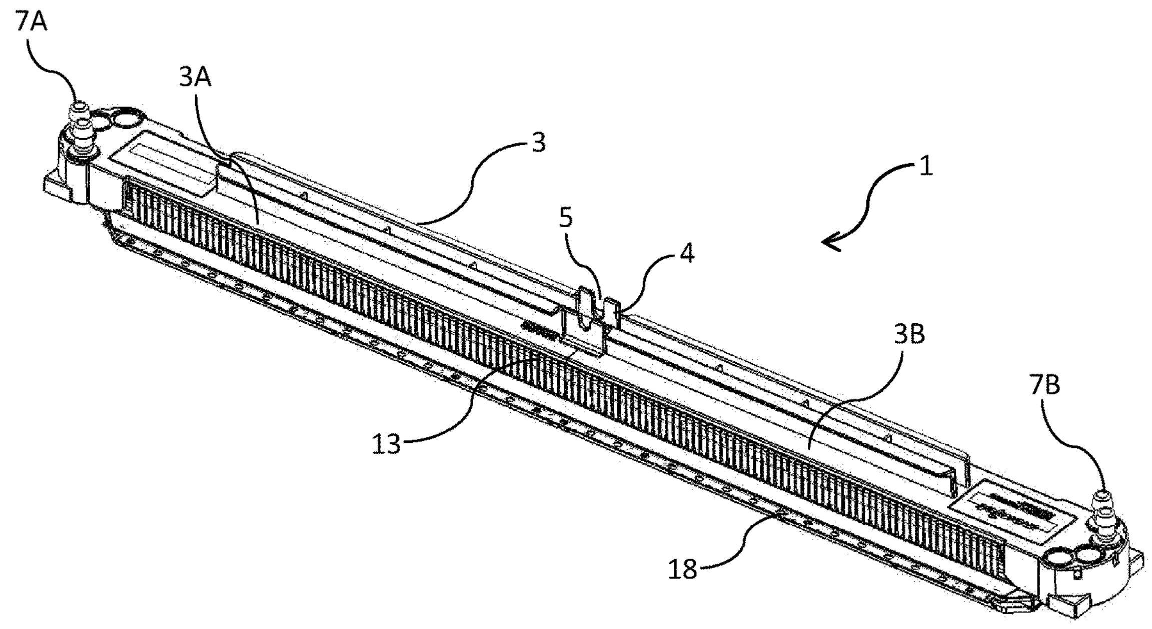
FIG. 1 is a front perspective view of an inkjet printhead.

Referring to FIGS. 1 to 4, there is shown an inkjet printhead 1 in the form of a replaceable printhead cartridge for user insertion in a printer (not shown). The printhead 1 comprises an elongate molded plastics casing 3 having a first casing part 3A and a second casing part 3B positioned at either side of a central locator 4. The central locator 4 has an alignment notch 5 for positioning the printhead cartridge 1 relative to a print module, such as a print module of the type described in US2017/0313061, the contents of which are incorporated herein by reference. The first and second casing parts 3A and 3B are biased towards each other and the central locator 4 by means of a spring clip 6 engaged between the first and second casing parts (see FIG. 4). The two-part casing 3 in combination with the spring clip 6 enables the casing to expand longitudinally, at least to some extent, to accommodate a degree of longitudinal expansion in a main body 17 of the printhead 1. This arrangement minimizes stress or bowing of the main body 17 of the printhead 1 during use.

Inlet connectors 7A of a multi-channel inlet coupling 8A protrude upwards through openings at one end of the casing 3; and outlet connectors 7B of a multichannel outlet coupling 8B protrude upwards through opening at an opposite end of the casing (only two inlet connectors and two outlet connectors shown in FIG. 1). The inlet and outlet connectors 7A and 7B are configured for coupling with complementary fluid couplings (not shown) supplying ink to and from the printhead. The complementary fluid couplings may be, for example, part of an ink delivery module and/or print module of the type described in US2017/0313061.

The printhead 1 receives power and data signals via opposite rows of electrical contacts 13, which extend along respective sidewalls of the printhead. The electrical contacts 13 are configured to receive power and data signals from complementary contacts of a printer (not shown) or print module and deliver the power and data to printhead chips 70 via a PCB, as will be explained in more detail below.

Figure 2:
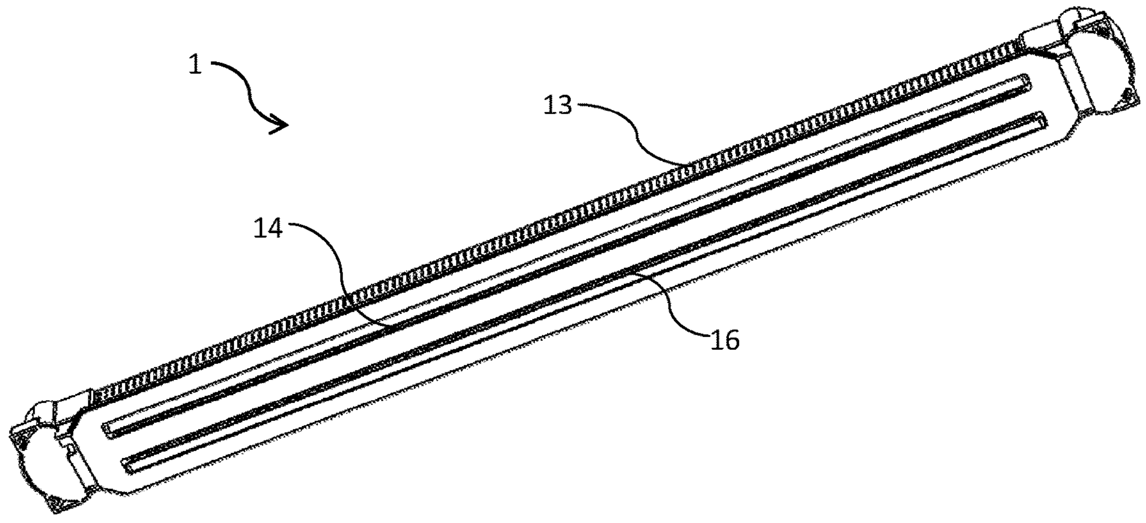
FIG. 2 is a bottom perspective of the printhead.

As shown in FIG. 2, the printhead 1 comprises a first row 14 and a second row 16 of printhead chips for printing onto print media (not shown) passing beneath the printhead. Each row of printhead chips is configured for printing two colors of ink, such that the printhead 1 is a full color pagewide printhead capable of printing four ink colors (CMYK). The printhead 1 is generally symmetrical about a longitudinal plane bisecting the first row 14 and the second row 16 of printhead chips, notwithstanding the different ink colors in the printhead during use.

Figure 3:
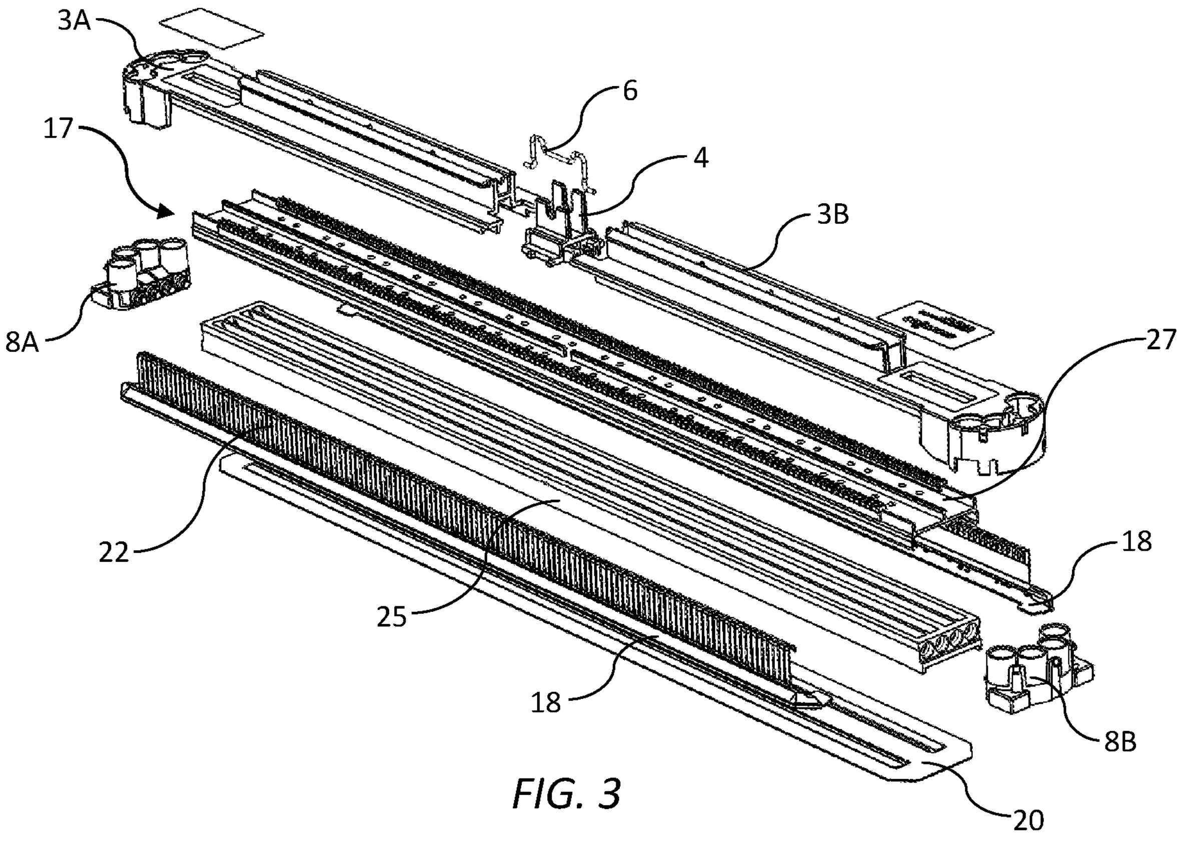
FIG. 3 is an exploded perspective of the printhead.
Figure 4:
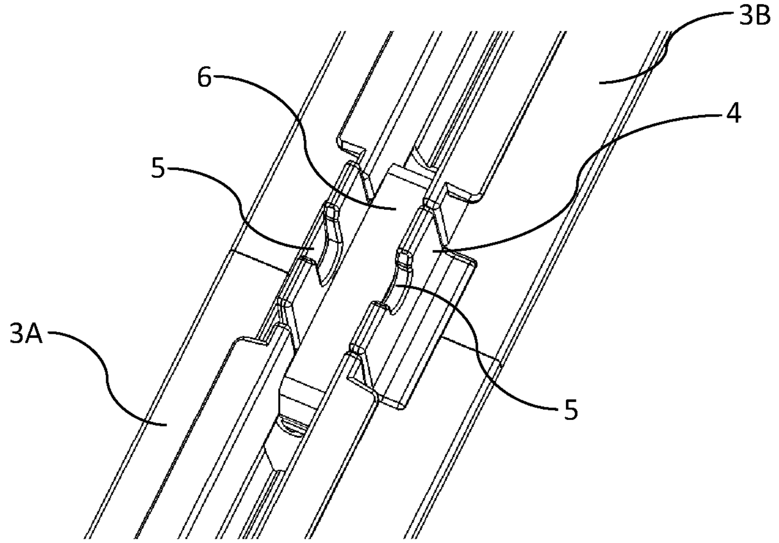
FIG. 4 is a magnified view of a central portion of a casing of the printhead.

In the exploded perspective shown in FIG. 3, it can be seen that the main body 17 forms a rigid core of the printhead 1 for mounting various other components. In particular, the casing 3 is snap-fitted to an upper part of the main body 17; the inlet and outlet couplings 8A and 8B (enshrouded by the casing 3) are connected to opposite ends of the main body; a pair of PCBs 18 are attached to a lower part of the main body (which are in turn covered by a shield plate 20); and a plurality of leads 22 (which define the electrical contacts 13) are mounted to opposite sidewalls of the main body.

Figure 5:
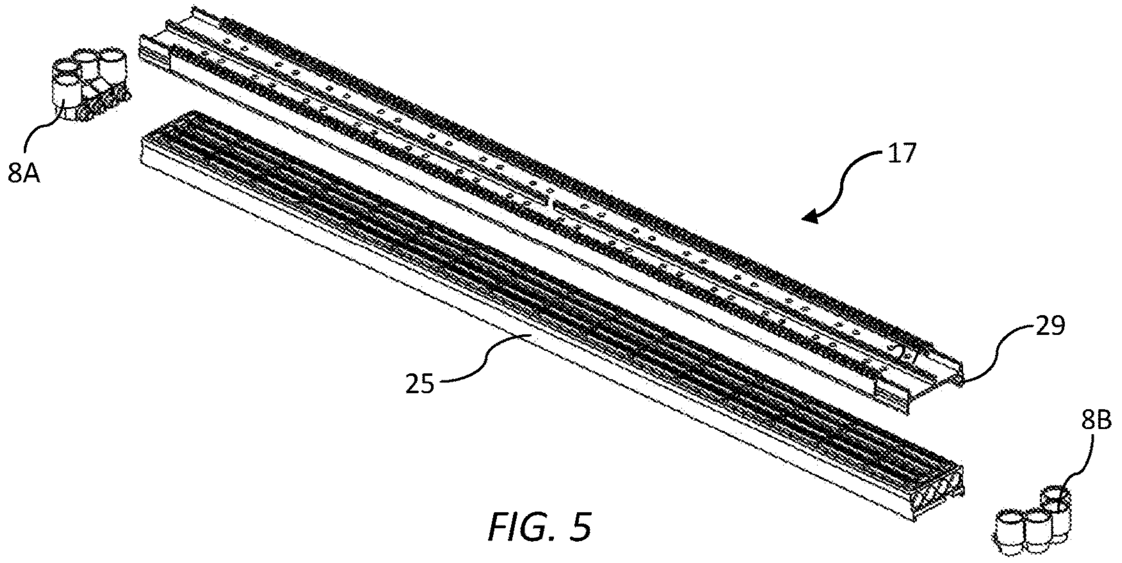
FIG. 5 is an exploded perspective of a main body of the printhead with inlet and outlet couplings.

Referring to FIG. 5, the main body 17 is itself a two-part machined structure comprising an elongate manifold 25 and a complementary cover plate 27. The manifold 25 functions as a carrier having a unitary lower surface for mounting both the first and second rows 14 and 16 of printhead chips. The manifold 25 is received between a pair of opposed flanges 29, which extend downwardly from opposite longitudinal sides of the cover plate 27. The flanges 29 are configured for snap-locking engagement with complementary snap-locking features 26 of the manifold 25 to form the assembled main body 17.

The manifold 25 and cover plate 27 are formed of a metal alloy material having excellent stiffness and a relatively low coefficient of thermal expansion (e.g. Invar). In combination, the manifold 25 and cover plate 27 provide a stiff, rigid structure at the core of the printhead 1 with minimal expansion along its longitudinal axis. As foreshadowed above, the casing 3 is configured so as not to constrain any longitudinal expansion of the main body 17 and thereby minimizes bowing of the printhead during use. Accordingly, the printhead 1 may be provided as an A4-length printhead or an A3-length printhead. It is an advantage of the present invention that a single pagewide printhead may be configured up to A3-length (i.e. up to 300 mm). Hitherto, pagewide printing onto A3-sized media was only possible via multiple printhead modules stitched together in a pagewide array and the printhead 1, therefore, expands the commercial viability for A3-sized, color pagewide printing.

Figure 6:
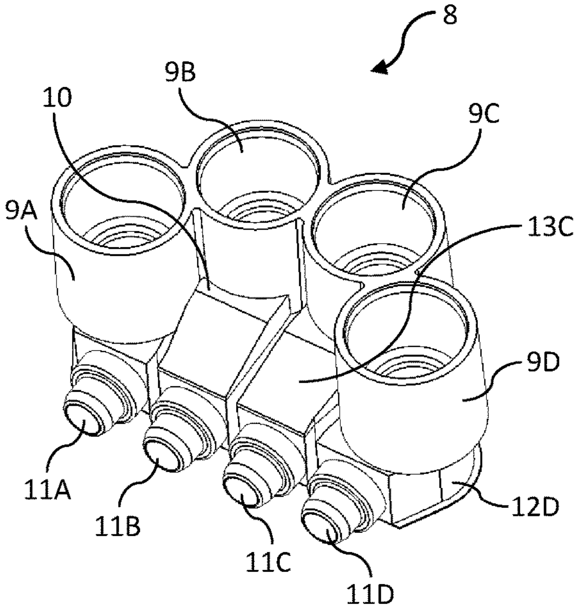
FIG. 6 is a perspective of a fluid coupling.

FIG. 6 shows in detail one of the multi-channel fluid couplings 8, which may be either the inlet coupling 8A or the outlet coupling 8B. However, for the purposes of describing features in connection with FIG. 6, the fluid coupling 8 shown is assumed to be the inlet coupling 8A.

The fluid coupling 8 is designed to transfer four colors of ink through a 90-degree angle for vertical coupling of the printhead 1 to, for example, a complementary fluid coupling of a print module, whilst ensuring that four fluid connectors can be geometrically accommodated within the space constraints of the printhead and its surrounds. Furthermore, the fluid coupling 8 is designed to equalize any pressure drops through the fluid coupling, such that the four ink colors have the same or similar relative pressures when they enters the manifold 25.

Figure 7A:
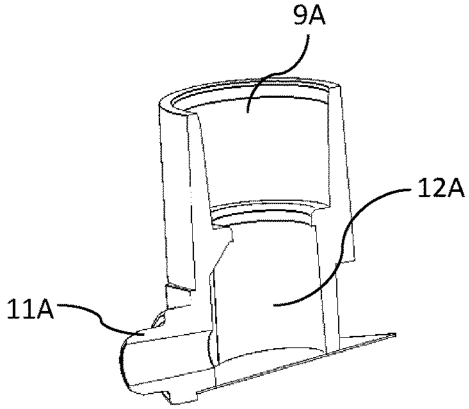
FIG. 7A is a sectional perspective through a first channel of the fluid coupling.
Figure 7B:
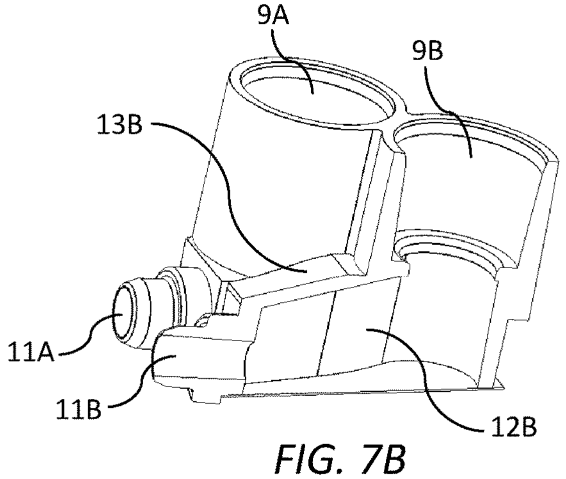
FIG. 7B is a sectional perspective through a second channel of the fluid coupling.

Referring then to FIGS. 6, 7A and 7B, the fluid coupling 8 comprises four inlet ports 9A-D, which extend vertically upwards from a coupling body 10, and corresponding outlet ports 11A-D extending from the coupling body perpendicular to the inlet ports. The inlet ports 9A-9D are radially arranged about the coupling body 10, such that the two outer inlet ports 9A and 9D are relatively proximal their respective outlet ports 11A and 11D; and the two inner inlet ports 9B and 9C are relatively distal their respective outlet ports. The radial arrangement of the inlet ports 9A-9D enables the inlet ports to be accommodated within the space constraints of a print module (not shown) engaged with the printhead. Furthermore, the inlet ports have coplanar upper surfaces for simultaneous vertical engagement/disengagement during printhead insertion/removal.

Each ink entering the fluid coupling 8 has a carefully controlled respective hydrostatic pressure (e.g. by virtue of an upstream pressure regulator) and it is important that the relative hydrostatic pressures of the inks are not changed as the inks flow through the fluid coupling. For example, the four inks may enter the inlets ports 9A-9D with equal hydrostatic pressures and it is desirable that these inks exit the outlet ports 11A-11D into the manifold 25 with equal hydrostatic pressures. A degree of pressure drop is, to some extent, inevitable as each ink experiences flow resistance (i.e. viscous drag) through the fluid coupling 8; however, it is important that the pressure drops are equalized for all inks despite the longer fluidic paths for the two inks flowing through the two inner inlet ports 9B and 9C. Accordingly, as shown in FIG. 7B, a fluid channel 12B connecting the inlet port 9B with the outlet port 11B has a roof 13B sloped upwards from towards the inlet port 9B. A roof 13C of a corresponding fluidic channel connecting the inlet port 9C and the outlet port 11C is, likewise, sloped upwards towards the inlet port 9C. By contrast the fluid channel 12A connecting inlet port 9A with the outlet port 11A does not have a similarly sloped roof, requiring the fluid to turn through a tighter angle without assistance from a more curved fluid path.

Thus, the roof configuration of the two inner fluid channels 12B and 12C has the effect of negating any additional flow resistance that might be caused by their relatively longer fluidic paths compared to the two outer fluid channels 12A and 12D. Thus, a pressure drop through the fluid coupling 8 is the same or similar for all four fluid channels 12A-12D and each of the four outlet ports 11A-11D will have equal hydrostatic pressures when inks entering the four inlet ports 9A-D have equal hydrostatic pressures. By contrast, fluid connectors for printheads known in the art, such as the fluid connector described in U.S. Pat. No. 7,399,069 (assigned to HP, Inc.), have appreciable differences in flow resistances (and pressure drops) for various fluid channels with different lengths.

Figure 8:
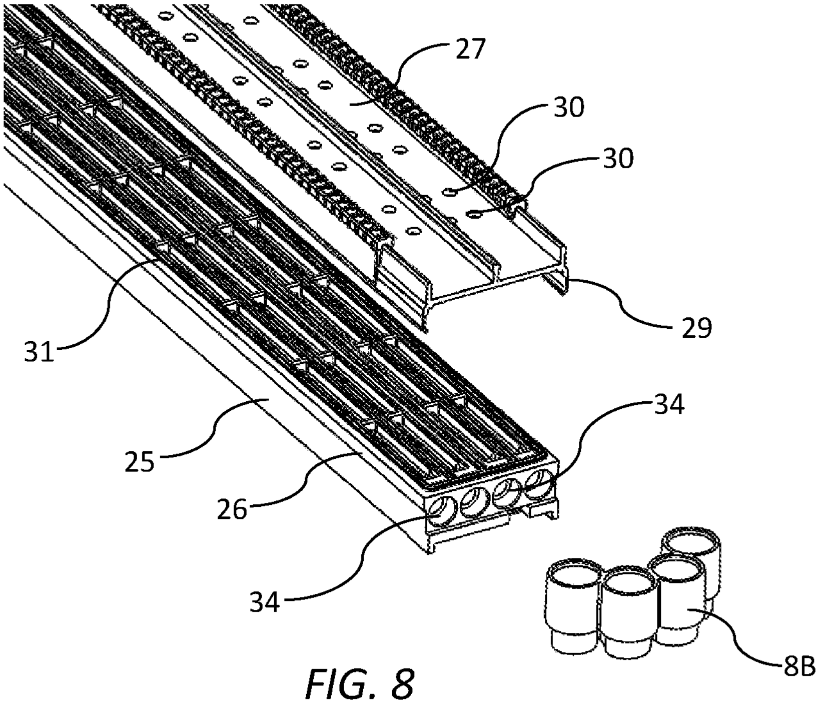
FIG. 8 is a magnified exploded perspective of an end of the main body with one fluid coupling removed.

FIG. 8 is a magnified view of an outlet end of the manifold 25 and cover plate 27 together with the outlet coupling 8B. It will be seen that the cover plate 27 has a plurality of vent holes 30 spaced apart along its length, which are open to atmosphere so as to allow free flexing of a flexible film 31 attached to an upper part of the manifold 25. The function of the flexible film 31 will be described in further detail below.

Still referring to FIG. 8, the multi-channel outlet coupling 8B receives ink from manifold ports 34 at one end of the manifold 25. Likewise, the multi-channel inlet coupling 8A delivers ink to manifolds ports 34 at an opposite end of the manifold 25. Of course, alternative coupling arrangements are within the ambit of the present invention.

Figure 9:
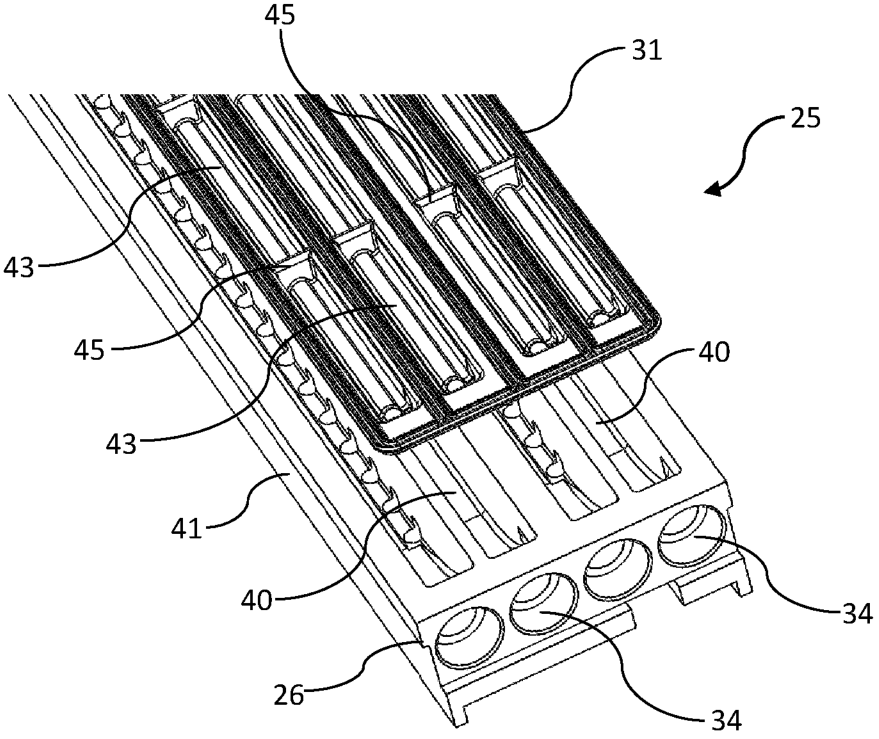
FIG. 9 is a magnified top perspective of an ink manifold with a flexible film removed.
Figure 10:
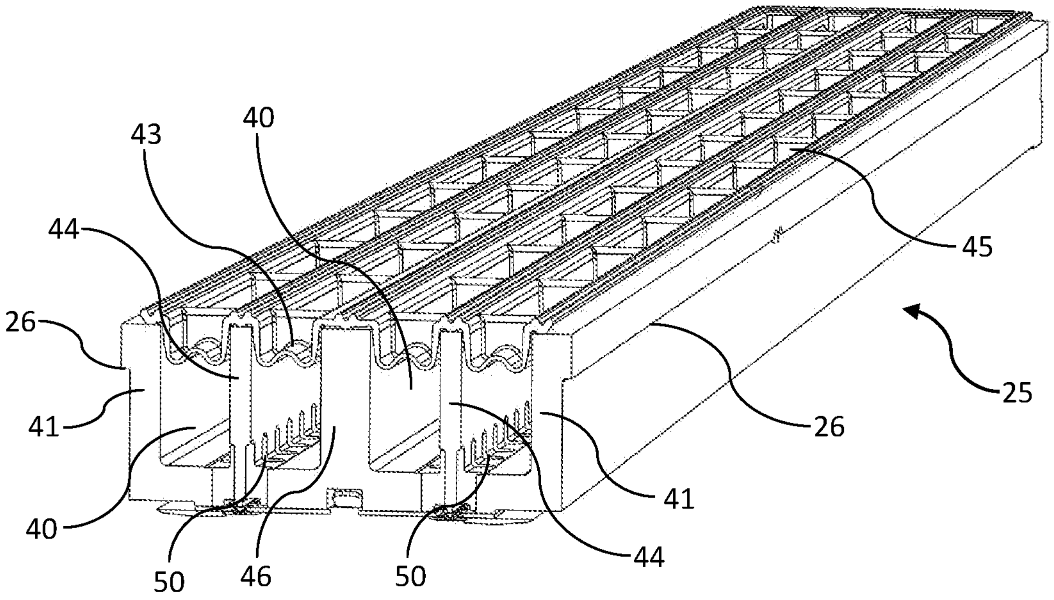
FIG. 10 is a sectional perspective of the ink manifold.

Referring now to FIGS. 9 and 10, the ink manifold 25 comprises four ink supply channels 40 extending longitudinally and parallel with manifold sidewalls 41. Each ink supply channel 40 is supplied with ink from a manifold port 34 at one end of the manifold 25 and ink exits the ink supply channel via a manifold outlet 34 at an opposite end of the manifold. The ink supply channels 40 are capped by the flexible film 31, covering an upper part of the manifold 25, with the flexible film 31 including a plurality of discrete corrugated sections or bellows 43.

Typically, printing systems are developed with several subsystems having differing fluidic response frequencies and the bellows 43 are designed to respond rapidly to hydrostatic pressure changes in the printhead 1. In order to maintain optimum ejection performance, internal pressures within the printhead 1 should optimally be maintained within a relatively narrow pressure window so as to allow nozzle refill consistency. Since ink delivery systems, which supply ink to the printhead 1, typically have a relatively slow response to dynamic pressure changes, rapid refill of inkjet nozzles in the printhead is controlled locally by the bellows 43 taking up an ejected volume of ink until the ink delivery system can respond. Similarly, the bellows 43 also perform a dampening function and can "absorb" pressure spikes when printing at full ink flow stops suddenly.

Figure 11:
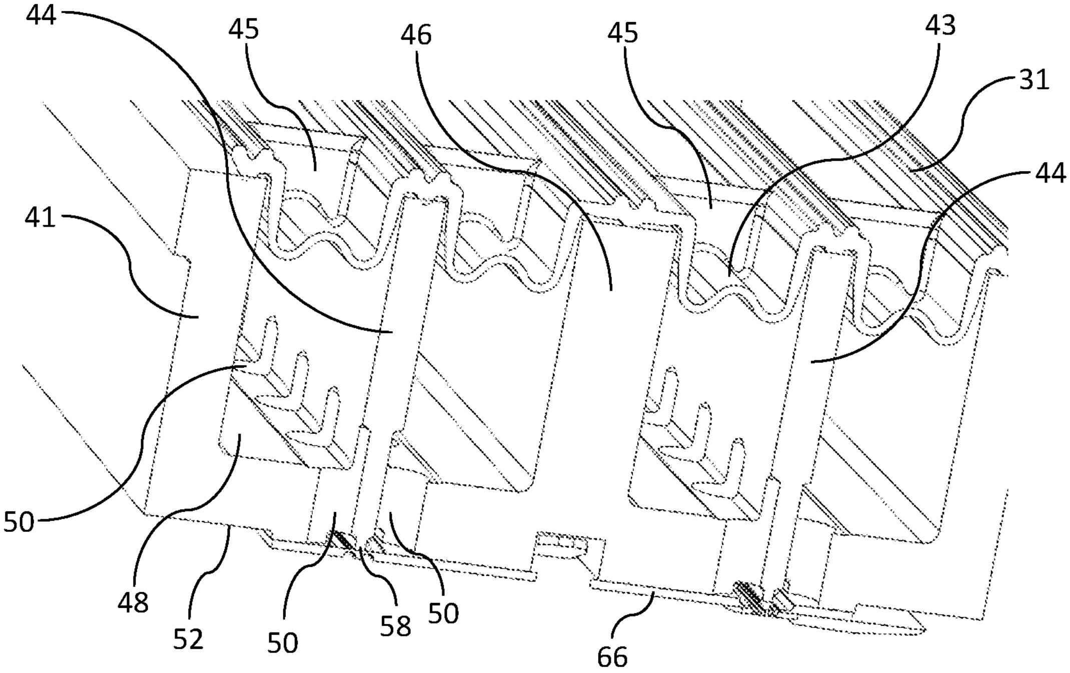
FIG. 11 is a magnified cross-sectional perspective of the ink manifold with a shim and one row of printhead chips removed.

It will be appreciated that the number and configuration of bellows 43 may be modified to optimize the performance of the printhead 1. In particular, the number and configuration of bellows 43 may be optimized to minimize undesirable resonance effects along the length of the ink supply channel 40. In this way, high ink demand in one portion of the ink supply channel 40 can be met by a number of bellows 43, without inducing a standing wave across an entire length of the flexible film 31. The bellows 43 may be separated into discretely operating units either by being spaced apart along the length of the film (e.g. with intervening planar sections of the film), or, as shown in FIGS. 9 to 11, by dividing the flexible film 31 into longitudinal sections using transverse baffles 45. The baffles 45 minimize generation of standing waves along a whole length of the film 31, whilst enabling the film to be molded from a single piece covering all four ink supply channels, thereby facilitating fabrication of the printhead 1.

It will be further appreciated that the bellows 43 can respond to pressure fluctuations without requiring air boxes, such as those described in U.S. Pat. No. 8,025,383. Therefore, the printhead 1 is suitable for use with degassed inks.

As best seen in FIG. 10, the bellows 43 'hang' from an upper surface of the manifold 25 into each of the ink supply channels 40. The bellows 43 hang down to a level corresponding to a level of the manifold ports 34, such that any air bubbles cannot become trapped in a headspace of the ink supply channels 40 below the bellows. Thus, if undesired air bubbles enter the ink supply channels 40, then these can be flushed out of the manifold 25 with a flow of ink through the manifold ports 34, rather than becoming trapped in a headspace above the ink flow.

Figure 12:
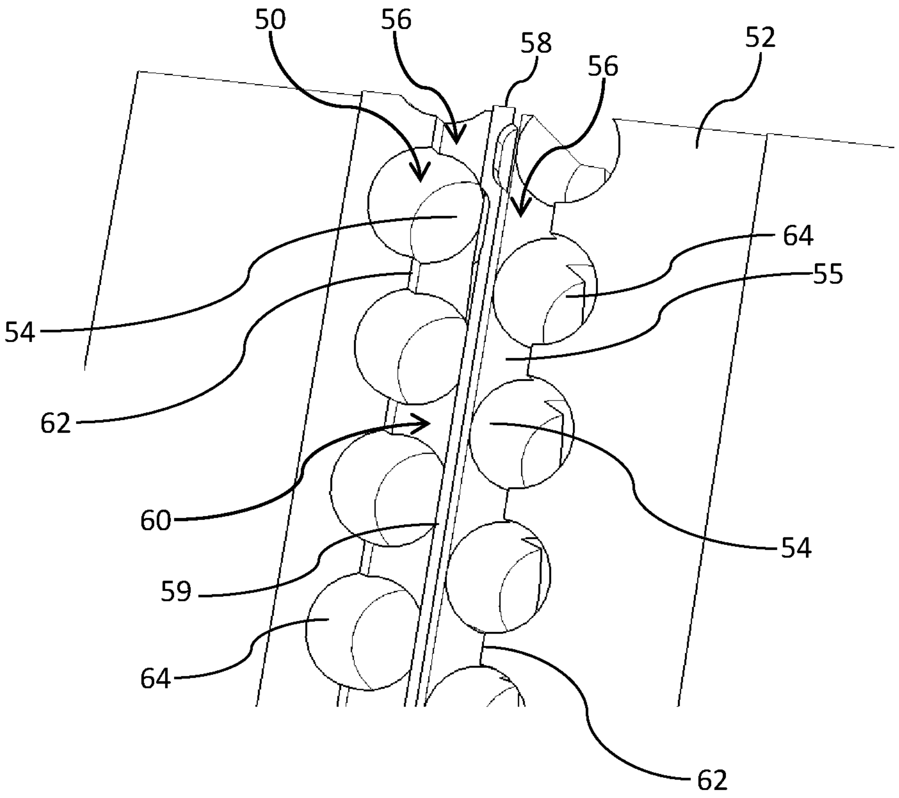
FIG. 12 is a magnified bottom perspective of a lower surface of the ink manifold.

Still referring to FIG. 10, the four ink supply channels 40 are arranged in pairs, with each pair being separated by a longitudinal dividing wall 44. A relatively thicker longitudinal central wall 46 separates the two pairs of ink channels 40. At a base 48 of each ink supply channel 40 and at opposite sides of the dividing wall 44 are defined a plurality of through-holes 50. The through-holes 50 supply ink to two parallel rows of printhead chips 70, as will now be described with reference to FIG. 11 to 13.

The through-holes 50 corresponding to one pair of ink supply channels 40 extend downwardly from the bases 48 of the ink supply channels towards a lower surface 52 of the manifold 25. Each through-hole 50 has a first portion 54 which meets with a cavity roof 55 of a longitudinal ink cavity 60 defined in the lower surface 52 of the manifold 25. A longitudinal rib 58 extends downwardly from the cavity roof 55 and divides the longitudinal ink cavity 60 into a pair of longitudinal ink feed channels 56 positioned at opposite sides of the rib. The longitudinal rib 58 has an end surface 59 coplanar with the lower surface 52 of the manifold.

The longitudinal ink cavity 60 has cavity sidewalls 62, which extend downwardly from the cavity roof 55 to meet with the lower surface 52 of the manifold 25. A second portion 64 of each through-hole 50 extends beyond the cavity roof 55 to meet with the lower surface 52. In this way, the second portions 64 of the through-holes 50 form notches in the cavity sidewalls 62. Similarly, and as best shown in FIG. 11, at least part of the first portions 54 of the through-holes 50 form notches in opposite sides of the dividing wall 44.

The notches defined by the second portions 64 of the through-holes 50 provide a space for air bubbles to expand and rise away from the printhead chips 70 during use. In the embodiment shown, the through-holes 50 are circular in cross-section with the first portion 54 and second portion 64 being generally semi-circular. However, it will be appreciated that the through-holes 50 may be of any suitable cross-sectional shape for optimizing ink flow and bubble management.

Figure 13:
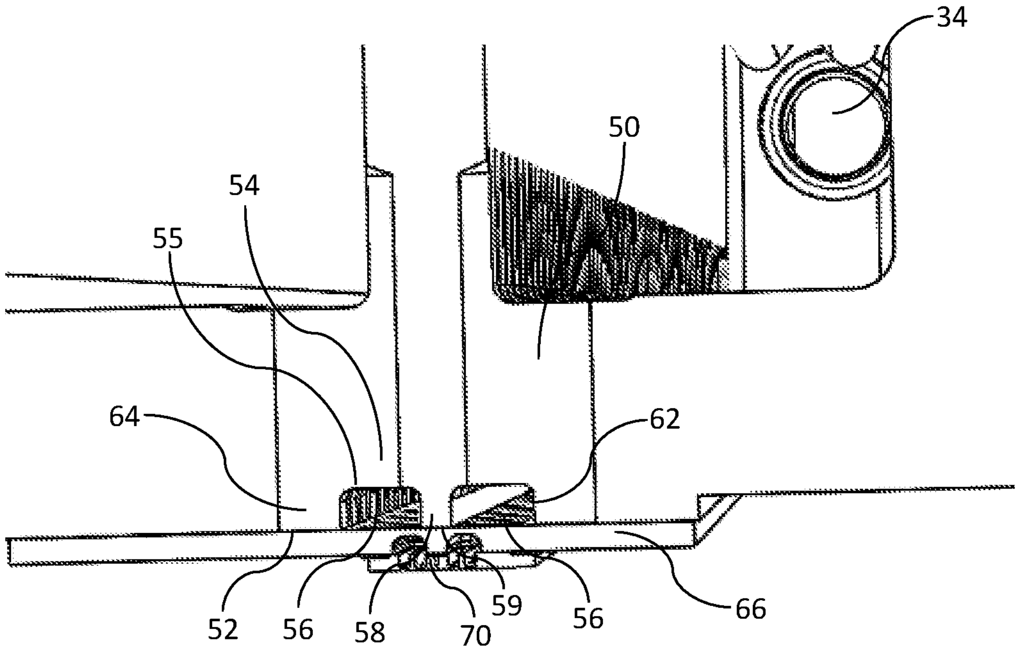
FIG. 13 is a sectional side view of a shim and printhead chip mounting arrangement.
Figure 14:
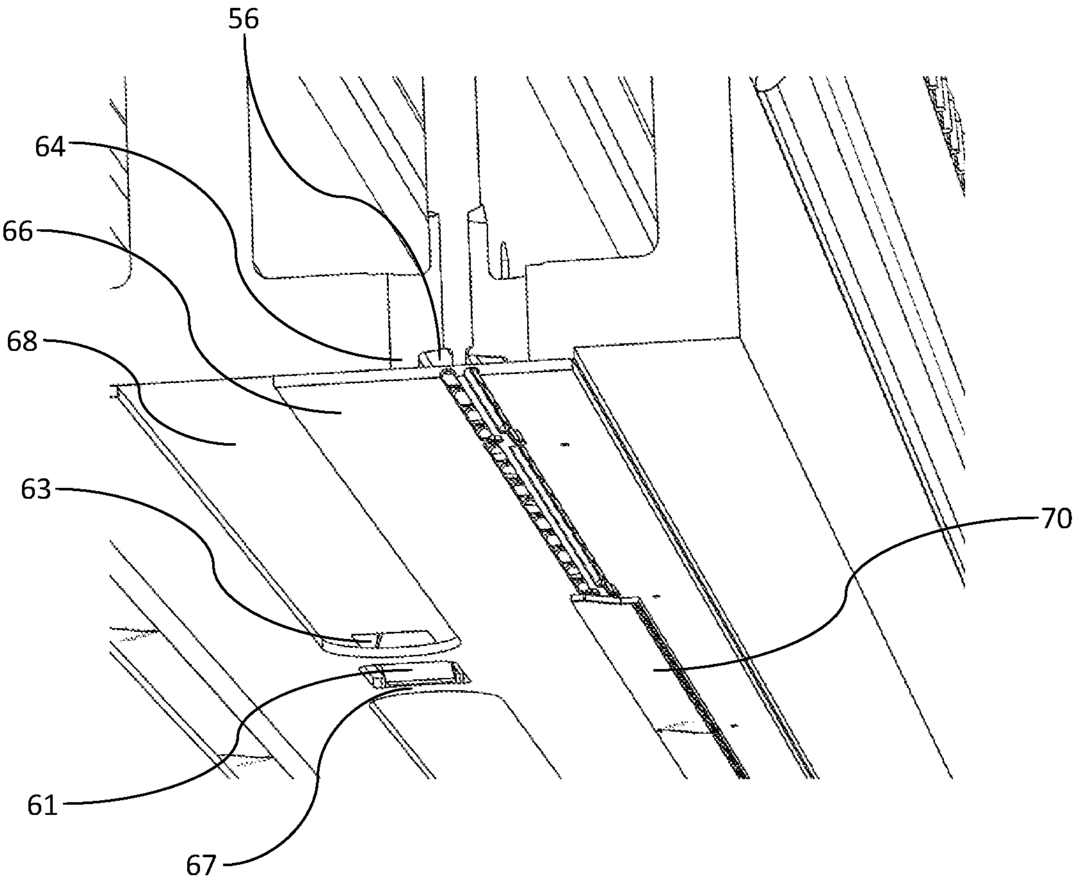
FIG. 14 is a sectional bottom perspective of the shim and printhead chip mounting arrangement.

As best shown in FIGS. 13 and 14, an Invar shim 66 is adhesively bonded to the lower surface 52 of the manifold 25 and the coplanar end surfaces 59 of the longitudinal ribs 58 so as to bridge across each of the longitudinal ink feed channels 56. Thus, the shim 66 seals across the second portions 64 of the through-holes 50, which meet with the lower surface 52 of the manifold 25.

In the embodiment shown, the shim 66 is a single-part shim bonded to the lower surface 52 of the manifold 25 so as to bridge across all four longitudinal ink feed channels 56 corresponding to the four colors of ink. Rows of butting printhead chips 70 are adhesively bonded to the shim 66 over a respective pair of ink feed channels 56 to form the first row 14 and the second row 16 of printhead chips.

Figure 16:
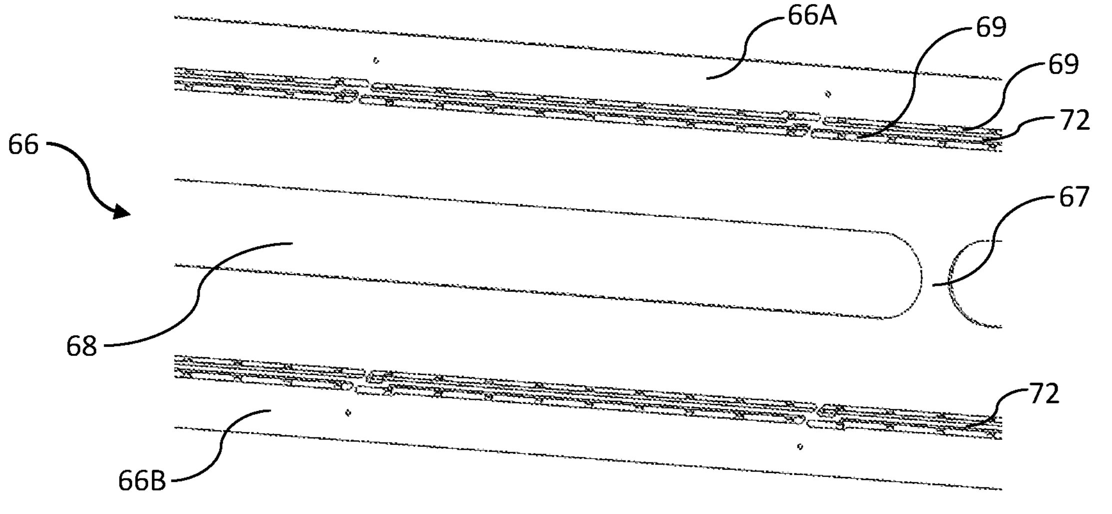
FIG. 16 is a top perspective of part of the shim.

The Invar shim 66, shown in isolation in FIG. 16, provides a stable platform for each row of printhead chips 70 with negligible thermal expansion during use. The shim 66 has a comparable thickness to the printhead chips 70 (e.g. about 100 to 1000 microns in thickness). Effectively, the Invar shim 66 enables construction of long printheads based on a monolithic manifold to which a plurality of printhead chips can be mounted.

Use of a singular shim 66 having a pair of longitudinal shim sections 66A and 66B minimizes relative skew of the first row 14 and second row 16 of printhead chips 70 by ensuring parallelism between the two shim sections 66A and 66B. Alignment of the shim 66 relative to the manifold 25 is facilitated using mechanical alignment tabs 61 on the shim, which engage with alignment features 63 in the form of recesses defined in the lower surface (see FIG. 14). It will be appreciated that the shim 66 has a number of alignment tabs 61 positioned for engagement with a corresponding plurality of alignment features 63 in the manifold 63. A plurality of alignment tabs 61 ensures alignment in both x- and y-axes.

A central longitudinal portion of the shim 66 defines voids 68 between a series of shim trusses 67 connecting the two main longitudinal sections 66A and 66B. Accordingly, a region between the first row 14 and second row 16 of printhead chips 70 is relatively thermally isolated from the lower surface 52 of the manifold 25, which acts a heat sink cooled by ink circulating through the manifold. Thermal isolation of this central region of the printhead 1 assists in minimizing cool spots between the first row 14 and second row 16 and advantageously minimizes condensation of ink onto the underside of the printhead during printing.

In use, each row of printhead chips 70 receives two inks from a respective pair of ink supply channels 40. Ink is supplied into the pair of longitudinal ink feed channels 56 via the through-holes 50, and thence into the backsides the printhead chips 70 via a pair of longitudinal shim slots 69 defined in each longitudinal shim section 66A and 66B. The longitudinal shim slots 69 extend along opposite sides of a longitudinal shim rib 72, which is itself aligned with the longitudinal rib 58 of the manifold 25.

The longitudinal ink feed channels 56 provide an open ink channel architecture, whereby a relatively large body of ink is in close proximity to the backsides of the printhead chips 70. This arrangement is suitable for printing at high print frequencies, whilst ensuring that inkjet nozzles in the printhead chips do not become starved of ink. Furthermore, the enlarged through-holes 50, each having a second portion 64 meeting with the shim 66 and offset from the printhead chips 70, provide a bubble-tolerant architecture whereby the risk of trapped air bubbles blocking a flow of ink into the printhead chips is minimized. Moreover, the first portions 54 and second portions 64 of the through-holes 50 facilitate venting of trapped air bubbles into the ink supply channels from where any air bubbles may be readily flushed from the printhead 1.

Figure 15:
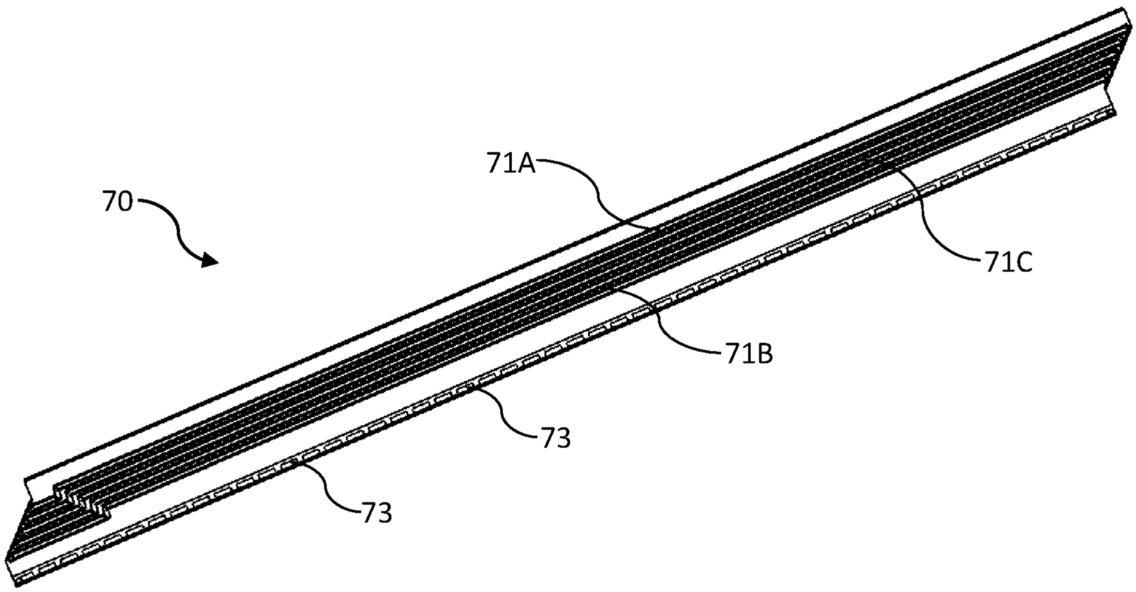
FIG. 15 shows an individual printhead chip.

Ink is supplied from the shim slots 72 to corresponding ink delivery slots defined in the backside of each printhead chip 70. A typical Memjet® printhead chip 70, shown in FIG. 15, comprises five color channels for potentially printing five inks. Five color channels in a single printhead chip provides flexibility for various different printing configurations and, hitherto, Memjet® printhead chips 70 have been plumbed for printing CMYK(IR), as described in U.S. Pat. No. 7,524,016; CMYKK as described in U.S. Pat. No. 8,613,502, CCMMY as described in U.S. Pat. No. 7,441,862, or monochrome (e.g. KKKKK) as described in US 2017/0313067, the contents of each of which are incorporated herein by reference. In the printhead 1, the first row 14 contains Memjet® printhead chips 70, which are typically plumbed for printing two colors of ink and the second row 16 contains Memjet® printhead chips, which are typically plumbed for printing two different colors of ink for full-color (CMYK) printing. Thus, the printhead 1 only makes use of four of the five available color channels in the Memjet® printhead chip. As shown in FIG. 15, two outer color channels 71A are used to print one color of ink fed from a respective ink feed channel 56; two opposite outer color channels 71B are used to print another color of ink fed from another respective ink feed channel; and the central color channel 71C contains a dummy row of non-ejecting nozzles, which do not receive any ink from the manifold 25. As best shown in FIG. 13, a central portion of the printhead chip 70 corresponding to the dummy color channel 71C is aligned with the longitudinal rib 58 of the manifold 25 to provide additional mechanical support for mounting the printhead chip. A backside ink delivery slot corresponding to the dummy channel 71C in the printhead chip 70 may be non-etched or only partially etched to provide additional mechanical support. In some embodiments, partial etching of backside channels may be useful for accommodating adhesive squeeze-out during mounting of the printhead chips 70.

Notwithstanding the mechanical advantages of the central dummy color channel 71C in the printhead chip 70, additional advantages may be achieved in terms of temperature regulation. Although the row(s) of nozzles corresponding to the dummy color channel 71C do not receive any ink, they may still be electrically connected to a printer controller in order to heat the printhead chip, as required. Temperature regulation across all color channels in a printhead chip is important for achieving consistent print quality and a central dummy row of non-ejecting nozzles, each having an active heater element, may be used achieve improved temperature regulation across the printhead chip.

Figure 17:
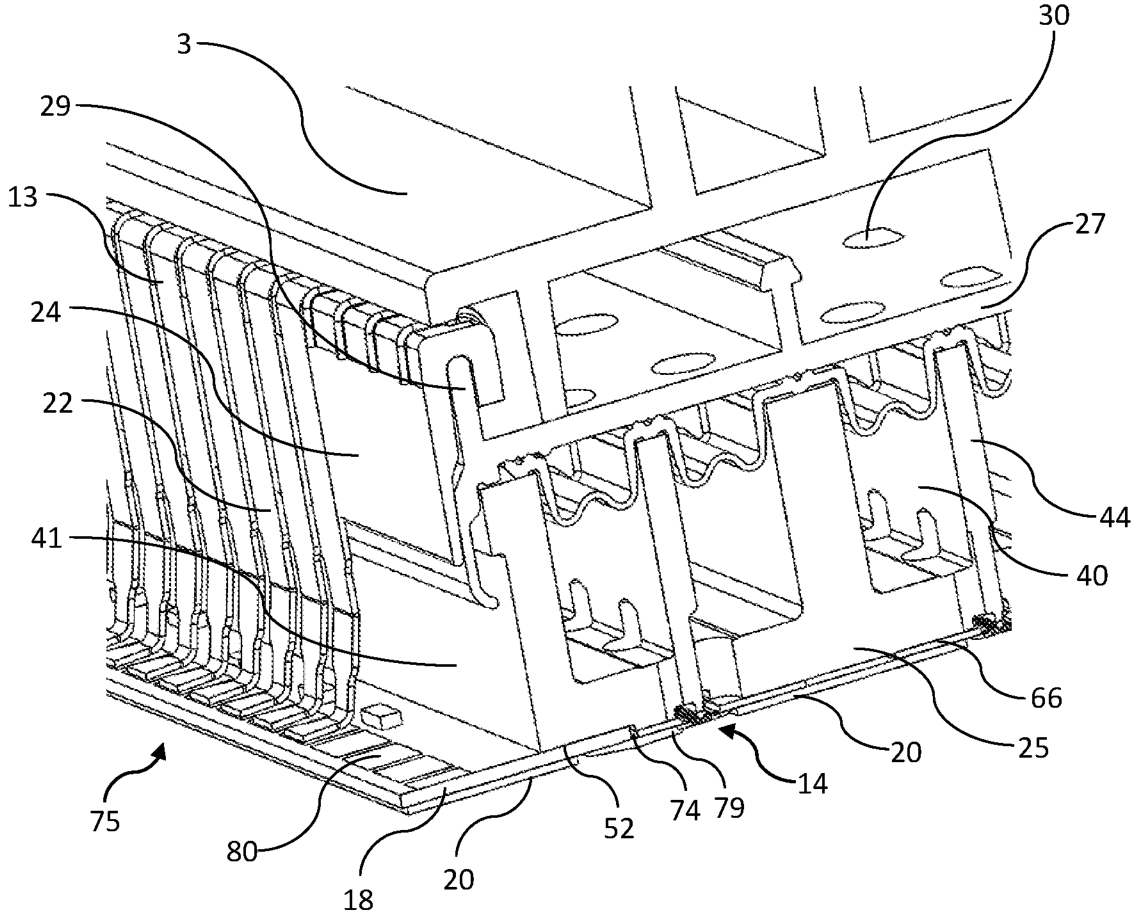
FIG. 17 is a sectional side perspective of the printhead.
Figure 18:
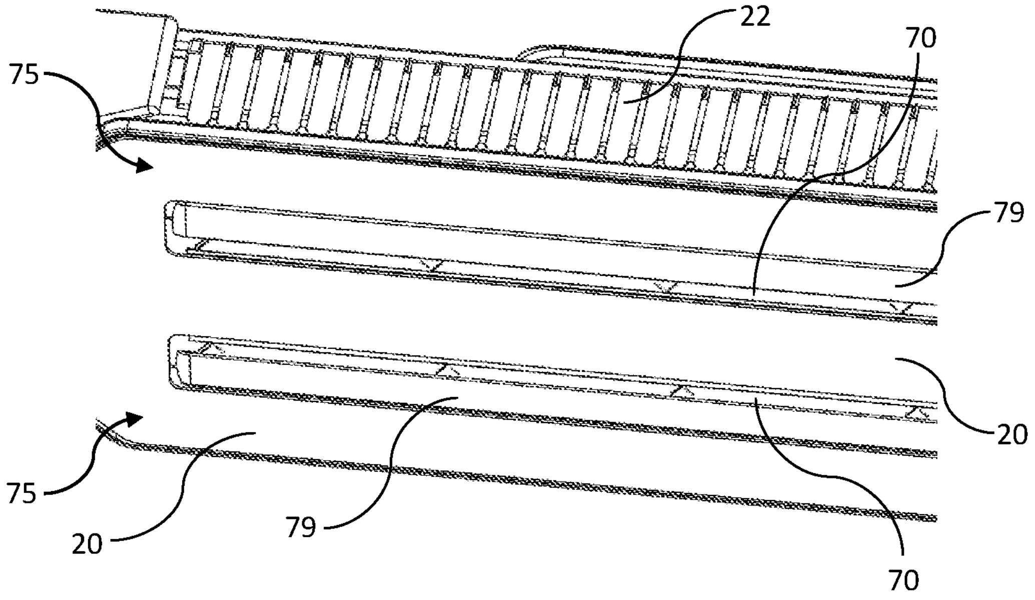
FIG. 18 is a bottom perspective of part of the printhead.
Figure 19:
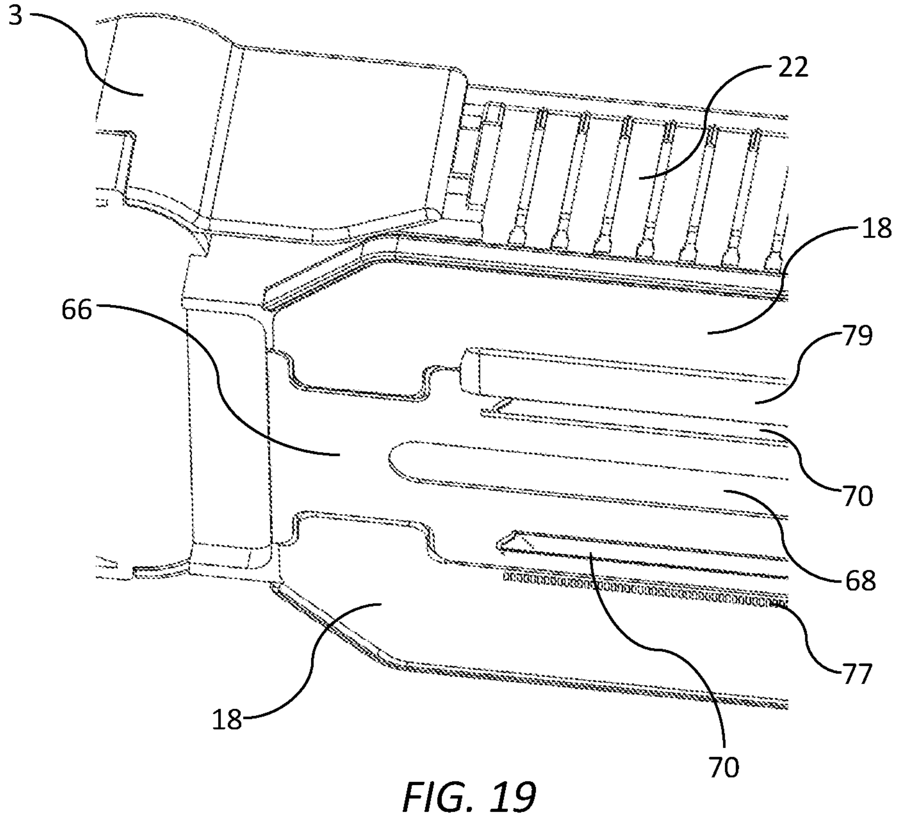
FIG. 19 is a magnified bottom perspective of the printhead with a shield plate and one row of encapsulant removed.

Turning to FIGS. 17 to 19, the electrical wiring arrangements for the printhead 1 will now be described in more detail. A pair of longitudinal PCBs 18 flank the first row 14 and second row 16 of printhead chips 70 at opposite sides thereof, each PCB being bonded to the lower surface 52 of the manifold 25. Each PCB 18 comprises a rigid substrate (e.g. FR-4 substrate) for mounting of various electronics components and has one edge butting against a step 74 defined in the lower surface 52 of the manifold 25. Each PCB 18 extends laterally outwards beyond the sidewalls 41 of the manifold 25. The shield plate 20 is bonded to a lower surface of each PCB 18 and surrounds the first and second rows 14 and 16 of printhead chips 70 as well as a central longitudinal region between the first and second rows. The protruding portions of each PCB 18 and the shield plate 20 define opposite wings 75 of the printhead 1, while a uniformly planar lower surface of the shield plate 20 is configured for engagement with a perimeter capper (not shown) surrounding both rows of printhead chips.

An edge of each PCB 18 proximal a respective row of printhead chips 70 has a respective row of pinouts 77, each pinout being connected to a respective bond pad 73 on one of the printhead chips via a wirebond connection (not shown). An encapsulant 79 protects the wirebonds and extends between the proximal edge of each PCB 18 and an opposed edge of the printhead chips 70 containing the bond pads 73. The PCBs 18 generate heat and warm the shield plate 20 exposed to ink aerosol during printing. As foreshadowed above, a central portion of the shield plate 20 is relatively thermally isolated from the manifold 25 by virtue of the voids 68 defined in the shim 66. Accordingly, condensation of ink onto a central longitudinal region of the shield plate 20, between the first row 14 and second row 16 of printhead chips 70, is minimized.

As best seen in FIG. 17, a row of contact pads 80 extends longitudinally along a distal edge portion of an upper surface of each PCB 18. Each lead 22 has one end connected to a contact pad 80 and extends upwardly towards a respective sidewall of the main body 17. The leads 22 have an upper portion mounted to a respective flange 29 of the cover plate 27 via a lead retainer 24 affixed thereto, and a lower portion which flares laterally outwards towards the contact pads 80. Each lead 22 also has a portion defining the electrical contact 13 for connection to external power and data connectors of a printer. In this way, each row of printhead chips 70 receives power and data from the electricals contacts 13 via respective leads 22 and a respective PCB 18 adjacent the row of printhead chips.

The printhead 1 described hereinabove therefore has a number of features for addressing the challenges of pagewide printing, especially full-color pagewide printing using relatively long printheads.

It will, of course, be appreciated that the present invention has been described by way of example only and that modifications of detail may be made within the scope of the invention, which is defined in the accompanying claims.

The invention claimed is:

1. An inkjet printhead for printing redundantly in four colors, said printhead comprising:

an ink manifold having first, second, third and fourth ink reservoirs for supplying first, second, third and fourth inks, respectively; and first and second parallel and laterally aligned printhead chips mounted on the ink manifold, wherein the ink manifold comprises:

a first longitudinal ink feed slot configured for feeding the first ink from the first ink reservoir to first and second nozzle rows in the first printhead chip;

a second longitudinal ink feed slot configured for feeding the second ink from the second ink reservoir to third and fourth nozzle rows in the first printhead chip;

a third longitudinal ink feed slot configured for feeding the third ink from the third ink reservoir to first and second nozzle rows in the second printhead chip; and a fourth longitudinal ink feed slot configured for feeding the fourth ink from the fourth ink reservoir to third and fourth nozzle rows in the second printhead chip, and wherein:

the first, second, third and fourth nozzle rows of the first and second printhead chips are all aligned with each other for printing onto a same dot position on a page;

the first and second printhead chips are oppositely oriented relative to each other;

the first and second printhead chips each has a row of bond pads extending along only one longitudinal edge thereof and parallel with the nozzle rows;

the rows of bond pads are positioned at opposite distal longitudinal edges of the oppositely oriented first and second printhead chips for electrical connection thereto.

2. The printhead of claim 1, wherein the first, second, third and fourth inks are each independently selected from the group consisting of: cyan, magenta, yellow and black ink.

3. The printhead of claim 1, wherein a distance between the first and second printhead chips is less than 30 mm.

4. The printhead of claim 1, wherein each printhead chip comprises first, second, third and fourth backside ink delivery slots for receiving respective first, second, third and fourth inks from respective first, second, third and fourth ink feed slots.

5. The printhead of claim 4, wherein each printhead chip comprises at least five nozzle rows, and wherein a center nozzle row is non-ejecting.

6. The printhead of claim 5, wherein each printhead chip is absent an ink delivery slot corresponding to the non-ejecting center nozzle-row.

7. The printhead of claim 1, wherein all four inks are printed simultaneously for dot-on-dot full color printing.

8. The printhead of claim 1, wherein the nozzle rows are aligned in a printing direction for redundant printing.

9. The printhead of claim 1, wherein the first, second, third and fourth ink feed slots extend longitudinally along a length of the printhead chips.

* * * * *